United States Patent
Pike et al.

(10) Patent No.: US 10,970,050 B1
(45) Date of Patent: Apr. 6, 2021

(54) USER INTERFACE ENGINE FOR MINIAPP DEVELOPMENT

(71) Applicant: ADP, LLC, Roseland, NJ (US)

(72) Inventors: Yair Pike, New York, NY (US); Christopher Fahey, New York, NY (US); Lauren Miller, New York, NY (US); Lohit Sarma, New York, NY (US); Harshita Daddala, New York, NY (US); Joseph Pirtle, New York, NY (US)

(73) Assignee: ADP, LLC, Roseland, NJ (US)

( * ) Notice: Subject to any disclaimer, the term of this patent is extended or adjusted under 35 U.S.C. 154(b) by 0 days.

(21) Appl. No.: 16/585,744

(22) Filed: Sep. 27, 2019

(51) Int. Cl.
*G06F 8/34* (2018.01)
*G06F 3/0482* (2013.01)
*G06F 3/0486* (2013.01)
*G06F 9/451* (2018.01)

(52) U.S. Cl.
CPC .............. *G06F 8/34* (2013.01); *G06F 3/0482* (2013.01); *G06F 3/0486* (2013.01); *G06F 9/451* (2018.02)

(58) Field of Classification Search
CPC ........ G06F 8/34; G06F 3/0482; G06F 3/0486; G06F 9/451
See application file for complete search history.

(56) References Cited

U.S. PATENT DOCUMENTS

| | | | |
|---|---|---|---|
| 8,478,616 B2 | 7/2013 | De Klerk et al. | |
| 2003/0058280 A1 | 3/2003 | Molinari et al. | |
| 2005/0065970 A1 | 3/2005 | King et al. | |
| 2005/0172261 A1 | 8/2005 | Yuknewicz et al. | |
| 2009/0106680 A1* | 4/2009 | Brownholtz | G06F 3/0486 715/769 |
| 2010/0037156 A1* | 2/2010 | Hosoda | G06F 8/38 715/763 |
| 2010/0146396 A1 | 6/2010 | Able et al. | |
| 2012/0291006 A1 | 11/2012 | Quine | |
| 2015/0160820 A1* | 6/2015 | Leue | G06F 3/0486 717/109 |
| 2018/0024731 A1* | 1/2018 | Sanches | G06F 8/38 715/763 |
| 2018/0096417 A1* | 4/2018 | Cook | H04L 67/306 |
| 2019/0235845 A1* | 8/2019 | Watanabe | G06F 8/34 |

\* cited by examiner

*Primary Examiner* — Daxin Wu
(74) *Attorney, Agent, or Firm* — Yee & Associates, P.C.

(57) ABSTRACT

A method, computer system, and computer program product compose a business rule. A computer system displays a set of tiles within a first area of a graphical user interface, each tile corresponding to a set of data nodes that are composable into structured data objects according to a domain-specific language. Dragging a selected tile from the first area to a drop zone within a second area of the graphical user interface appends the corresponding set of data nodes into a structured data object. Receiving a user input that sets focus on the drop zone displays a text field that replaces the drop zone w. A drop-down list is associated with the text field. The drop-down list consists of a set of permissible tiles for data nodes that can be appended to the structured data object according to a context of the structured data object.

15 Claims, 12 Drawing Sheets

FIG. 8

USER INTERFACE ENGINE FOR MINIAPP DEVELOPMENT

BACKGROUND INFORMATION

1. Field

The present disclosure relates to methods and devices for creating special purpose computers whose hardware and programming enable transformation of a user interface and transformation of the function of a computer such that an untrained user may develop applications.

2. Background

Currently, when a new computer program is desired, a trained programmer uses one or more specialized computer languages to create code. Code instructs a computer to perform a desired function.

In most cases, even for simple programs, the programmer must have extensive training in order to write code that will be capable of creating the desired computer functionality. In the case of complex software, the programmer may need to develop an architecture for the computer program, and then write the code to implement the architecture. For a large project, an entire team of trained programmers may be needed to create the desired code.

Thus, the process of coding is complex, expensive, and, for some individuals, beyond their ability. For most individuals, the solution to providing a computer with a desired functionality is to purchase pre-programmed software to enable the desired functionality. For example, a user desiring to use a computer to perform business accounting may purchase an accounting program that provides a computer with the functionality of performing accounting procedures on the computer.

Nevertheless, a user may desire specialized functionality for the computer that is not currently for sale, or may desire to modify an existing program. However, unless that user is a trained programmer and is willing to expend the resources needed to code a new program, the user will not be able to use the desired specialized functionality on the computer.

SUMMARY

The illustrative embodiments provide for a method of transforming a computer by changing a function of the computer without a user providing the computer with computer code. The method includes displaying, by a computer system, a set of tiles, each tile corresponding to a set of data nodes that are composable structured data objects according to a domain-specific language. The set of tiles are displayed within a first area of a graphical user interface. The method further includes displaying, by the computer system, a set of drop zones within a second area of the graphical user interface. Dragging a selected tile from the first area to a drop zone within the second area appends the corresponding set of data nodes into a structured data object according to the domain-specific language. The method also includes, responsive to receiving a user input that sets focus on the drop zone, displaying, by the computer system, a text field that replaces the drop zone within the second area. The method also includes, responsive to displaying the text field, displaying, by the computer system, a drop-down list associated with the text field. The drop-down list consists of a set of permissible tiles for data nodes that can be appended to the structured data object according to a context of the structured data object.

The illustrative embodiments also provide for a non-transitory computer-readable medium storing program code stored thereon. The program code includes code for displaying a set of tiles, each tile corresponding to a set of data nodes that are composable structured data objects according to a domain-specific language. The set of tiles are displayed within a first area of a graphical user interface. The program code includes code for displaying a set of drop zones within a second area of the graphical user interface. Dragging a selected tile from the first area to a drop zone within the second area appends the corresponding set of data nodes into a structured data object according to the domain-specific language. The program code also includes code for displaying a text field that replaces the drop zone within the second area in response to receiving a user input that sets focus on the drop zone. The program code also includes code for displaying a drop-down list associated with the text field. The drop-down list consists of a set of permissible tiles for data nodes that can be appended to the structured data object according to a context of the structured data object.

The illustrative embodiments provide for a computer system comprising a hardware processor and an application development system in communication with the hardware processor. The application development system is configured to display a set of tiles, each tile corresponding to a set of data nodes that are composable structured data objects according to a domain-specific language. The set of tiles are displayed within a first area of a graphical user interface. The application development system is configured to display a set of drop zones within a second area of the graphical user interface. Dragging a selected tile from the first area to a drop zone within the second area appends the corresponding set of data nodes into a structured data object according to the domain-specific language. The application development system is configured, responsive to receiving a user input that sets focus on the drop zone, to display a text field that replaces the drop zone within the second area. The application development system is configured, responsive to displaying the text field, to display a drop-down list associated with the text field, wherein the drop-down list consists of a set of permissible tiles for data nodes that can be appended to the structured data object according to a context of the structured data object.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 8 is an illustration of graphical user interface 600 with a drop-down list in accordance with to an illustrative embodiment;

DETAILED DESCRIPTION

The illustrative embodiments recognize and take into account that it is desirable to have a user interface engine to orchestrate development of miniapps within an enterprise development environment. User interface atomic components are the basis for miniapp development. The user interface engine architecture allows for rapid creation of user interface atomic components and allows for codeless integration with responsive and adaptive mobile and touch support.

The illustrative embodiments also recognize and take into account that binding of customer data to a user browser in a way that makes sense for all different developer use cases is a difficult and previously unsolved problem. Complicating this problem is the interaction of server side resources with the interface components in the browser that the user manipulates, as well as with business rules specified by a user. Thus, the illustrative embodiments recognize and take into account that while a user may perceive a codeless, seamless, and integrated application development experience, the underlying functionality of the user interface engine is highly complex in order to enable that user experience.

Figure 1:
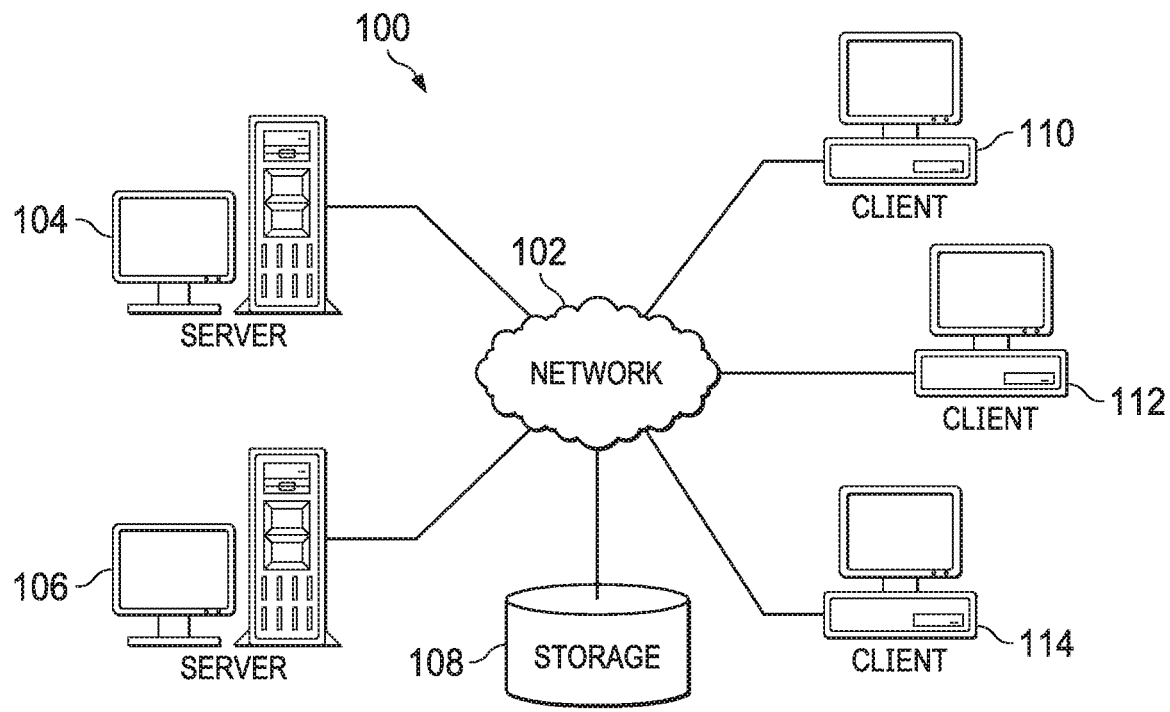
FIG. 1 is an illustration of a diagram of a data processing environment in accordance with an illustrative embodiment.

With reference now to the figures and, in particular, with reference to FIG. 1, an illustration of a diagram of a data processing environment is depicted in accordance with an illustrative embodiment. It should be appreciated that FIG. 1 is only provided as an illustration of one implementation and is not intended to imply any limitation, with regard to the environments in which the different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is a medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers include client computer 110, client computer 112, and client computer 114. Client computer 110, client computer 112, and client computer 114 connect to network 102. These connections can be wireless or wired connections depending on the implementation. Client computer 110, client computer 112, and client computer 114 may be, for example, personal computers or network computers. In the depicted example, server computer 104 provides information, such as boot files, operating system images, and applications to client computer 110, client computer 112, and client computer 114. Client computer 110, client computer 112, and client computer 114 are clients to server computer 104 in this example. Network data processing system 100 may include additional server computers, client computers, and other devices not shown.

Program code located in network data processing system 100 may be stored on a computer-recordable storage medium and downloaded to a data processing system or other device for use. For example, the program code may be stored on a computer-recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

The illustration of network data processing system 100 is not meant to limit the manner in which other illustrative embodiments can be implemented. For example, other client computers may be used in addition to or in place of client computer 110, client computer 112, and client computer 114 as depicted in FIG. 1. For example, client computer 110, client computer 112, and client computer 114 may include a tablet computer, a laptop computer, and other suitable types of clients.

Figure 2:
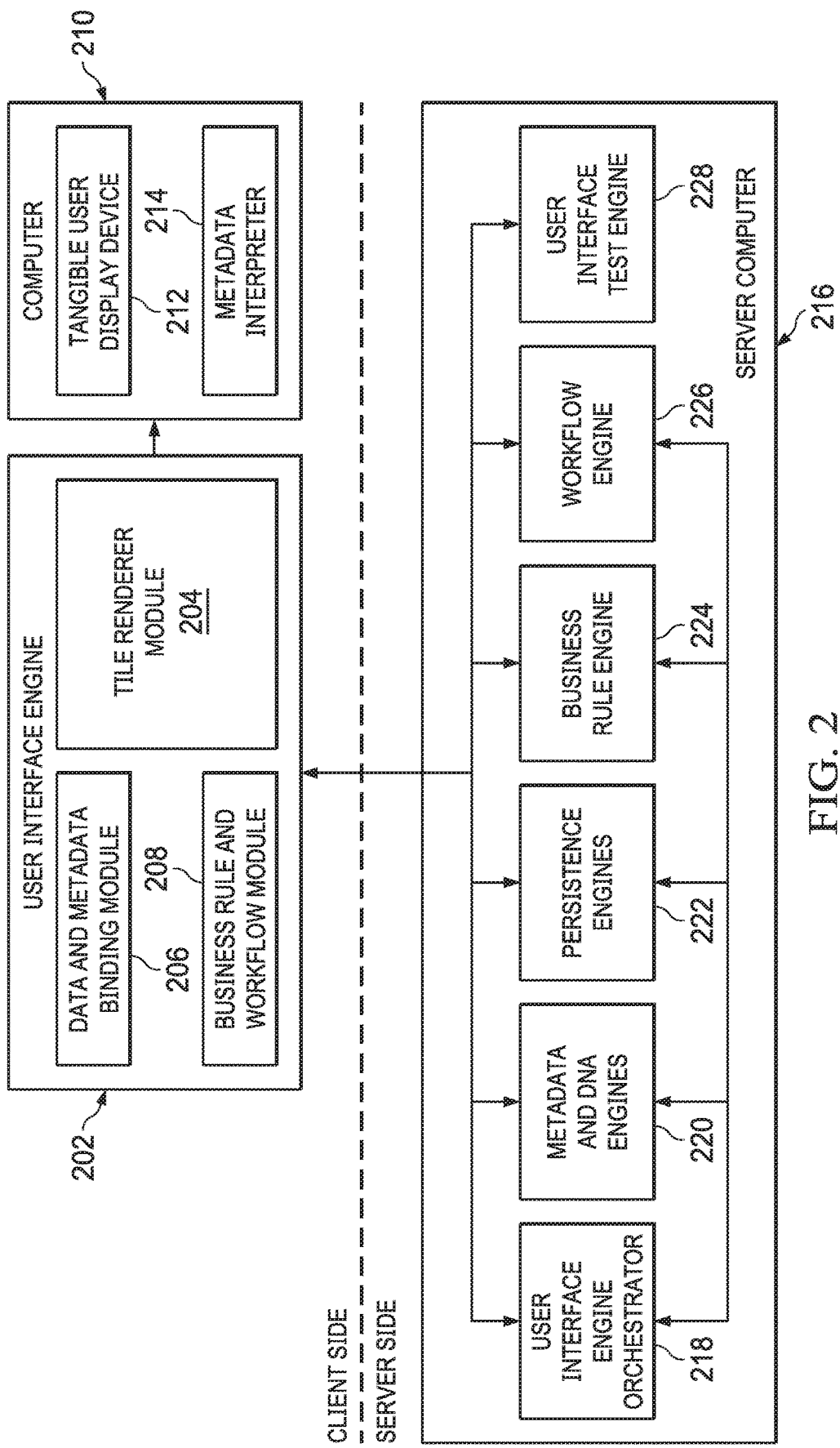
FIG. 2 is a block diagram illustrating an application development system for a domain-specific language entirely composed of structured data objects in accordance with an illustrative embodiment.

FIG. 2 is a block diagram illustrating an application development system for a domain-specific language entirely composed of structured data objects depicted in accordance with an illustrative embodiment. Application development system 200 may be used to manipulate composable data nodes to build at least one of business rules, mini-apps, and apps. Application development system 200 can be implemented in one or more of server computer 104, server computer 106, client computer 110, client computer 112, and client computer 114 of FIG. 1.

As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

User interface engine 202 is computer code, underlying data, and structured data objects which provide underlying functionality and implementation capability for application designers using application development system 200. Primarily, user interface engine 202 operates client-side, meaning that user interface engine 202 operates on a specific client user's computer, such as one or more of client computer 110, client computer 112, and client computer 114 of FIG. 1. In one illustrative example, user interface engine 202 could be a web browser or an extension to a web browser.

Underlying the user interface, user interface engine 202 may include one or more modules. As depicted, user interface engine 202 includes tile renderer module 204, data and metadata binding module 206, and business rule and workflow module 208. Each module may be considered a collection of software or computer code which implements the functionality of the module.

Tile renderer module 204 is computer code which computer 210 may use to render tiles on tangible user display device 212. Tile renderer module 204 may receive input from the user, from data and metadata binding module 206, and from business rule and workflow module 208 to change and manipulate both the functionality of computer 210, which is used to execute tile renderer module 204, as well as tangible user display device 212, which is used to display rendered tiles.

Data and metadata binding module 206 is computer code which computer 210 may use to bind data and structured data objects to the user interface, possibly a browser, so that user interface engine 202 may keep track of all of the data and structured data objects used in executing business rules and workflows, as well as rendering tiles. Additional details regarding the functionality of data and metadata binding module 206 is described below with respect to how data and metadata are used in user interface engine 202.

Business rule and workflow module 208 is computer code which computer 210 may use to create, join, merge, or otherwise manipulate composable data nodes in order to create mini-apps, collections, and bundles.

Business rule and workflow module 208 is the underlying code which allows a user to create mini-apps, collections, and bundles without the user having to code any of the software being developed. Using data and structured data objects tracked by data and metadata binding module 206, the user can manipulate tiles rendered by tile renderer module 204. Business rule and workflow module 208 uses these composable data nodes, together with work flows and business rules to create the mini-apps, collections, or bundles in a user-perceived codeless development environment.

Metadata interpreter 214 is hardware or software which is used to interpret or execute business rules in a business system. Metadata interpreter 214 can be software residing in a web browser on computer 210. However, the illustrative embodiments are not necessarily limited to only client computers or web browsers.

Metadata interpreter 214 is a code interpreter designed for a domain-specific language entirely composed of structured data objects. In one illustrative example, metadata interpreter 214 takes the form of an abstract syntax tree (AST) interpreter with the exception that the abstract syntax tree (AST) structure is composed of well-defined data nodes constructs, joined together in a domain-specific language. Because the data node constructs are well-defined when they are constructed, metadata interpreter 214 executes the composition of structured data objects without compilation. Data node constructs are composed into well-defined structured data objects according to selected block types and properties, replacing the tokenization and parsing that would otherwise occur during compilation.

In some illustrative embodiments, user interface engine 202 may take advantage of some server side services operating on one or more server computers, such as server computer 216. "Server side" means that computer 210 communicates with server computer 216, possibly over a network such as the Internet. Server side resources are provided to support user interface engine 202. While not always necessary for implementation of user interface engine 202, server side resources can enhance the functionality of user interface engine 202.

For example, the server side resources may include user interface engine orchestrator 218. In some exemplary illustrative embodiments, user interface engine orchestrator 218 may be considered part of user interface engine 202 such that user interface engine 202 operates partially both on computer 210, but also on one or more server computers, such as server computer 216.

User interface engine orchestrator 218 may serve as a proxy to speed up processing of user interface engine 202. User interface engine orchestrator 218 may retrieve structured data objects and then identify whether data queries are for customer data, business rules, or any other structured data objects. User interface engine orchestrator 218 may then request such data, objects, or code, from the data center operating server side. User interface engine orchestrator 218 may cache retrieved data, structured data objects, code, workflows, or objects to be sent back to user interface engine 202.

Server side services may include other components other than user interface engine orchestrator 218. For example, server side resources could include one or more metadata and DNA engines 220, which can be used to manage or provide metadata for use in user interface engine 202. Server side resources may also include one or more persistence engines 222, which can be used to save work done using user interface engine 202. Server side resources may also include business rule engine 224, which may be used to create or store business rules that are used by user interface engine 202 in the user-perceived codeless building of mini-apps, collections, and bundles.

Server side resources may also include workflow engine 226, which may be used to create or store workflows that are used by user interface engine 202 in the user-perceived codeless building of mini-apps, collections, and bundles.

Server side resources may also include user interface test engine 228, which may be used to test both the functionality of user interface engine 202, possibly as well as the mini-apps, collections, and bundles created using user interface engine 202.

Figure 3:
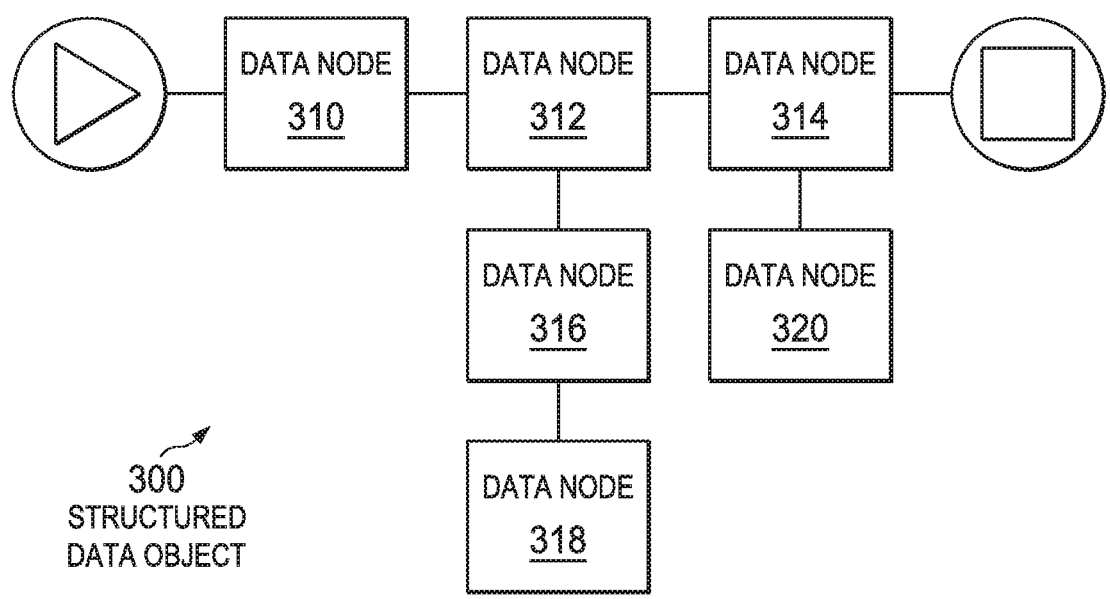
FIG. 3 is an illustration of a block diagram of a structured data object in accordance with an illustrative embodiment.

With reference next to FIG. 3, an illustration of a block diagram of a structured data object is depicted in accordance with an illustrative embodiment. Structured data object 300 is an example of a composition of well-defined data nodes that can be linked together according to a domain-specific language to create mini-apps, collections, or bundles in a user-perceived codeless development environment, such as application development system 200 of FIG. 2.

Structured data object 300 includes data nodes 310, 312, and 314. Data nodes 310, 312, and 314 are well-defined structured data objects that can be manipulated within data and metadata binding module 206 of FIG. 2 to create desired business rules. Tile renderer module 204 of user interface engine 202 may visually present data nodes 310, 312, and 314, enabling the user to build different business rules, mini-apps and apps in application development system 200 of FIG. 2. Each of data nodes 310, 312, and 314 correlate to one or more functions, which in turn can be interpreted by metadata interpreter 214 of FIG. 2 for implementing the corresponding business rule. The different permutations of the compositions of these functions, as well as differentiated input, enable the execution of the different business rule behaviors at runtime.

The functions of data nodes 310, 312, and 314 operate inside of a context defined at the beginning of the business rule execution step, which is the target object for all symbols defined in the course of the business rule execution, as well as for all input to and output from the business rule itself. In this manner, data nodes 310, 312, and 314 act as a configuration object to the code being executed, defining an execution context (or scope being executed against) to other joined data nodes.

For example, structured data object 300 further includes data node 316. Data node 316 provides additional context for execution of related data node 312. Specifically, data node 316 may indicate that data node 312, as well as child data nodes thereof, should be interpreted within the context of data node 316.

Structured data object 300 further includes data node 318. Data node 318 provides additional context for execution of both related data node 312 and data node 316. For example, data node 318 may indicate that information required for execution of data node 312 should be requested and received from one or more web services. Data node 318 requests and returns the same context updated with the information received through the web services.

Structured data object 300 further includes business rule node 320. Business rule node 320 provides additional context for execution of related data node 314. Specifically, business rule node 320 may indicate a consuming service for receipt of business rule output provided by related data node 314. Business rule node 320 requests and returns information to a consuming service, such as a web page.

Figure 4:
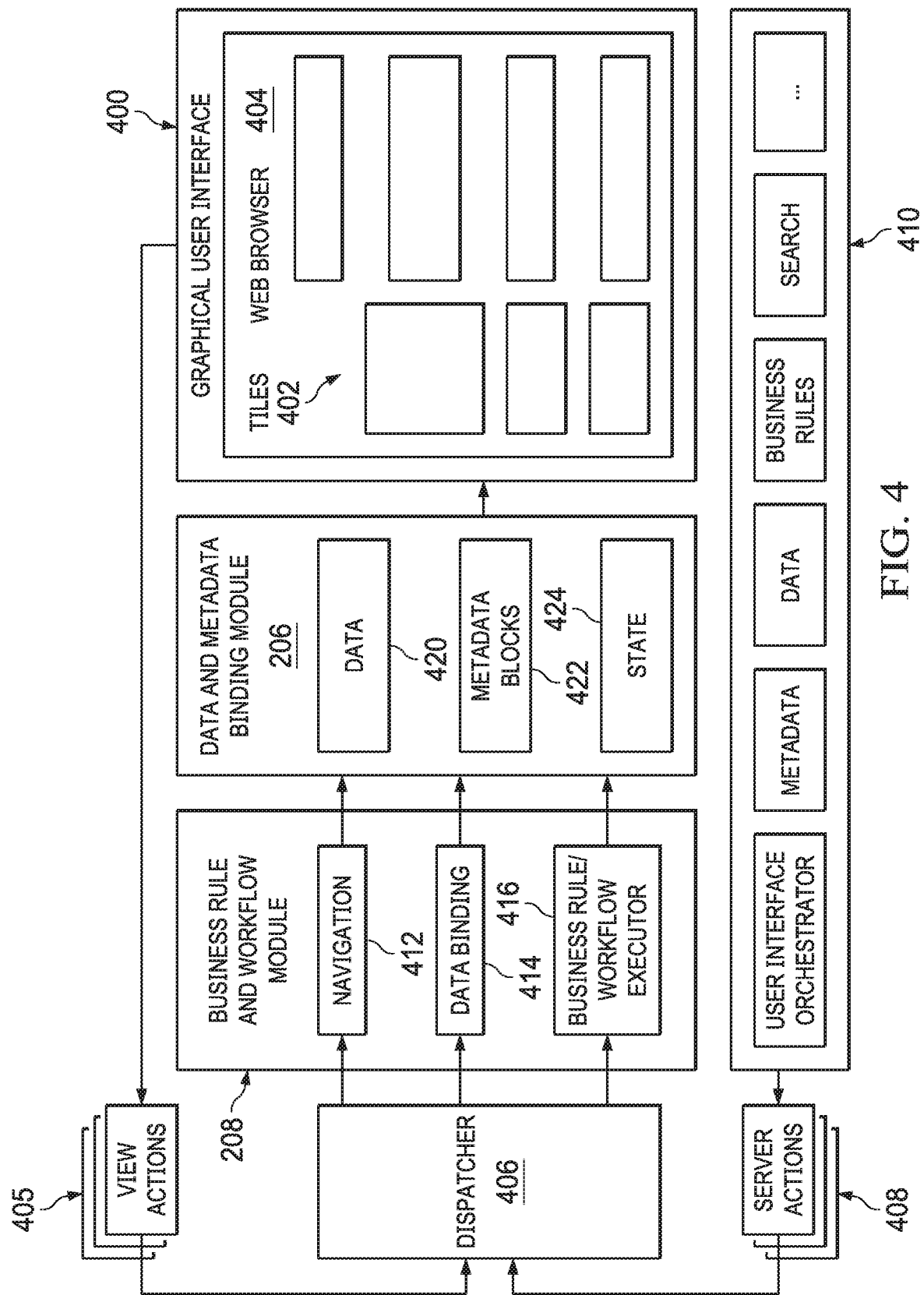
FIG. 4 is an illustration of a block diagram of an example of an operation of a user interface engine shown in FIG. 1 in accordance with an illustrative embodiment.

FIG. 4 is an illustration of a block diagram of an example of an operation of a user interface engine shown in FIG. 2, in accordance with an illustrative embodiment. The example shown in FIG. 4 does not necessarily limit operation of user interface engine 202 as shown in FIG. 2. Nevertheless, FIG. 4 may be read in conjunction with FIG. 2.

In an illustrative embodiment, tile renderer module 204 in FIG. 2 may be used to generate graphical user interface 400. Graphical user interface 400 may take the form of tiles 402 shown in web browser 404. Each of tiles 402 may represent a building block. Alternatively, a tile may represent a mini-app, a collection, or even a bundle. Users may interact with graphical user interface 400, triggering, for example, "view actions" command 405.

These actions are sent to dispatcher 406, which may be part of user interface engine 202, as shown in FIG. 1. Dispatcher 406 may send the actions to the business rule and workflow module via subscriptions registered with dispatcher 406. Dispatcher 406 may also send server actions 408 sent by data center 410 to business rule and workflow module 208 in FIG. 2 for use in combination with the actions started by the user.

Business rule and workflow module 208 may run queries and apply business rules and other logic. Business rule and workflow module 208 may provide navigation 412, data binding 414, and execution by business rules and workflows executor 416.

Data and metadata binding module 206 may apply changes to user interface state 418 held in memory. User interface state 418 may be held in a tree structure containing data 420, metadata 422, and tile state 424. In turn, tile renderer module 204 in FIG. 2 may render graphical user interface 400. Tile renderer module 204 may listen to state changes in the tree structure and efficiently update only data 420 and metadata 422 that need re-rendering.

Graphical user interface 400 enables users with little or no background in computer software development to simply drag-and-drop files that contain prebuilt features onto a canvas and start building applications. However, as a user's efficiency progresses over time, this repetitive drag-and-drop interaction becomes a tedious process in application development in low-code development environments.

Figure 5:
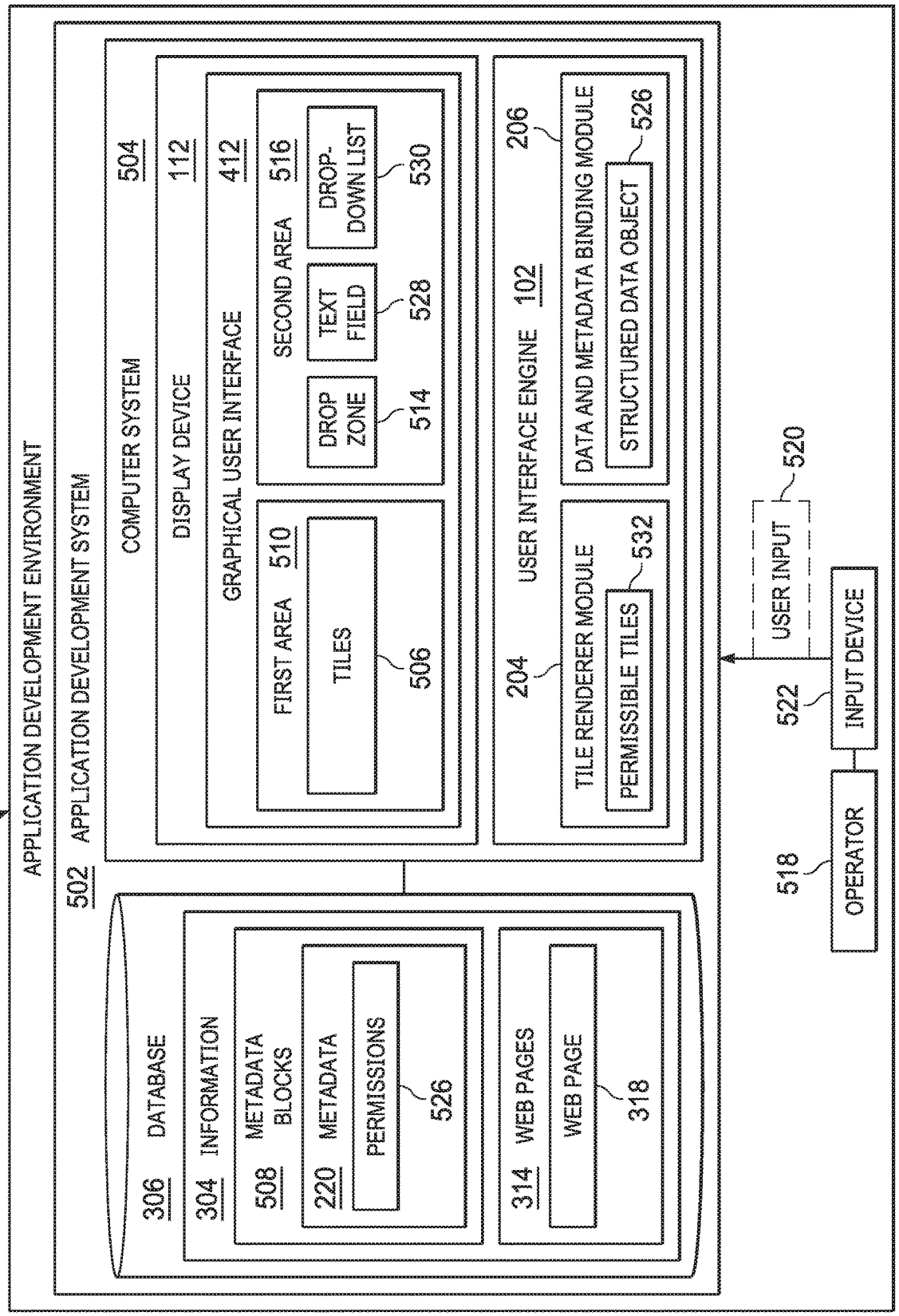
FIG. 5 is a block diagram of an application development environment in accordance with an illustrative embodiment.

With reference next to FIG. 5, a block diagram of an application development environment is depicted according to an illustrative example. Application development environment 500 includes application development system 502. Application development system 502 is an example of application development system 200 of FIG. 2. Application development system 502 can be implemented in computer system 504, which can be one or more of server computer 104, server computer 106, client computer 110, client computer 112, and client computer 114 of FIG. 1.

Application development system 502 may be implemented in software, hardware, firmware, or a combination thereof. When software is used, the operations performed by application development system 502 may be implemented in program code configured to run on hardware, such as a processor unit. When firmware is used, the operations performed by application development system 502 may be implemented in program code and data and stored in persistent memory to run on a processor unit. When hardware is employed, the hardware may include circuits that operate to perform the operations in application development system 502.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

In one illustrative example, application development system 502 displays a set of tiles 506, which are examples of tiles 402 of FIG. 4. Each one of tiles 506 corresponds to a set of metadata blocks 508. Metadata blocks 508 are examples of data nodes, such as data nodes 310-320 of FIG. 3. Data nodes 310-320 are composable into one or more structured data objects, such as structured data object 300 of FIG. 3, according to a domain-specific language. The set of tiles 506 are displayed within first area 510 of graphical user interface 512.

Application development system 502 displays a set of drop zones 514 within second area 516 of graphical user interface 512. As used herein, a "drop zone" is a control in graphical user interface 512. A control is a graphical and/or functional element that can be reused across graphical user interface (GUI) applications and which the user can select and activate to get additional information. A control, in a graphical user interface, is an object on the screen that can be manipulated by the user to perform some action.

Operator 518 can enter user input 520 using input device 522. Drop zones 514 enable operator 518 to enter user input 520 in the form of drag-and-drop operations. For example, dragging a selected one of tiles 506 from first area 510 to drop zone 514 within second area 516 appends the corresponding set of data nodes 508 into structured data object 526 according to the domain-specific language.

Application development system 502 allows users to drag-and-drop tiles 506. Additionally, application development system 502 enables a user to focus on a particular drop zone, automatically converting the drop zone into a text field with drop-down list.

In response to receiving user input 520 that sets focus on drop zone 514, application development system 502 displays text field 528 that replaces drop zone 514 within second area 516. Application development system 502 displays drop-down list 530 associated with text field 528.

Operator 518 can enter user input 520 using input device 522. Text field 528 enables operator 518 to enter user input 520 in the form of alphanumeric characters to select from tiles 506. For example, as operator 518 types alphanumeric characters into text field 528, application development system 502 will match what the user is typing to one or more of tiles 506, progressively narrowing drop-down list 530, displaying only those of tiles 506 that match user input 520 into text field 528. In response to receiving a selection of one of tiles 506, second area 516 based on user input 520 into text field 528, application development system 502 appends the corresponding set of data nodes 524 into structured data object 526 according to the domain-specific language. Drop-down list 530 enables operator 518 to enter user input 520 by selecting only permissible tiles. For example, in response to receiving user input 520 that sets focus on drop zone 514, application development system 502 displays only ones of tiles 506 in drop-down list 530 that are permissible based on a current context of structured data object 526, including any interrelation with a parent data node. Therefore, in this illustrative example, drop-down list 530 consists only of a set of permissible tiles 532 for data nodes that can be appended to the structured data object 526 according to a context of the structured data object 526.

In one illustrative example, application development system 502 identifies the context of structured data object 526 based on the set of data nodes displayed within the second area of the graphical user interface. For example, application development system 502 may interpret each of data nodes 524 linked within structured data object 526 using a metadata interpreter, such as metadata interpreter 214 of FIG. 2. The context of structured data object 526 is determined based on the interpreted arrangement of the data nodes within the structured data object. Application development system 502 can then identify the set of permissible tiles 532 based on the context of structured data object 526.

As a result, when implemented in a computer system, application development system 502 operates as a special purpose computer system in which application development system 502 enables operator 518 to more quickly compose structured data object 526. Therefore, application development system 502 transforms a computer system into a special purpose computer system as compared to currently available general computer systems that do not have application development system 502.

Figure 6:
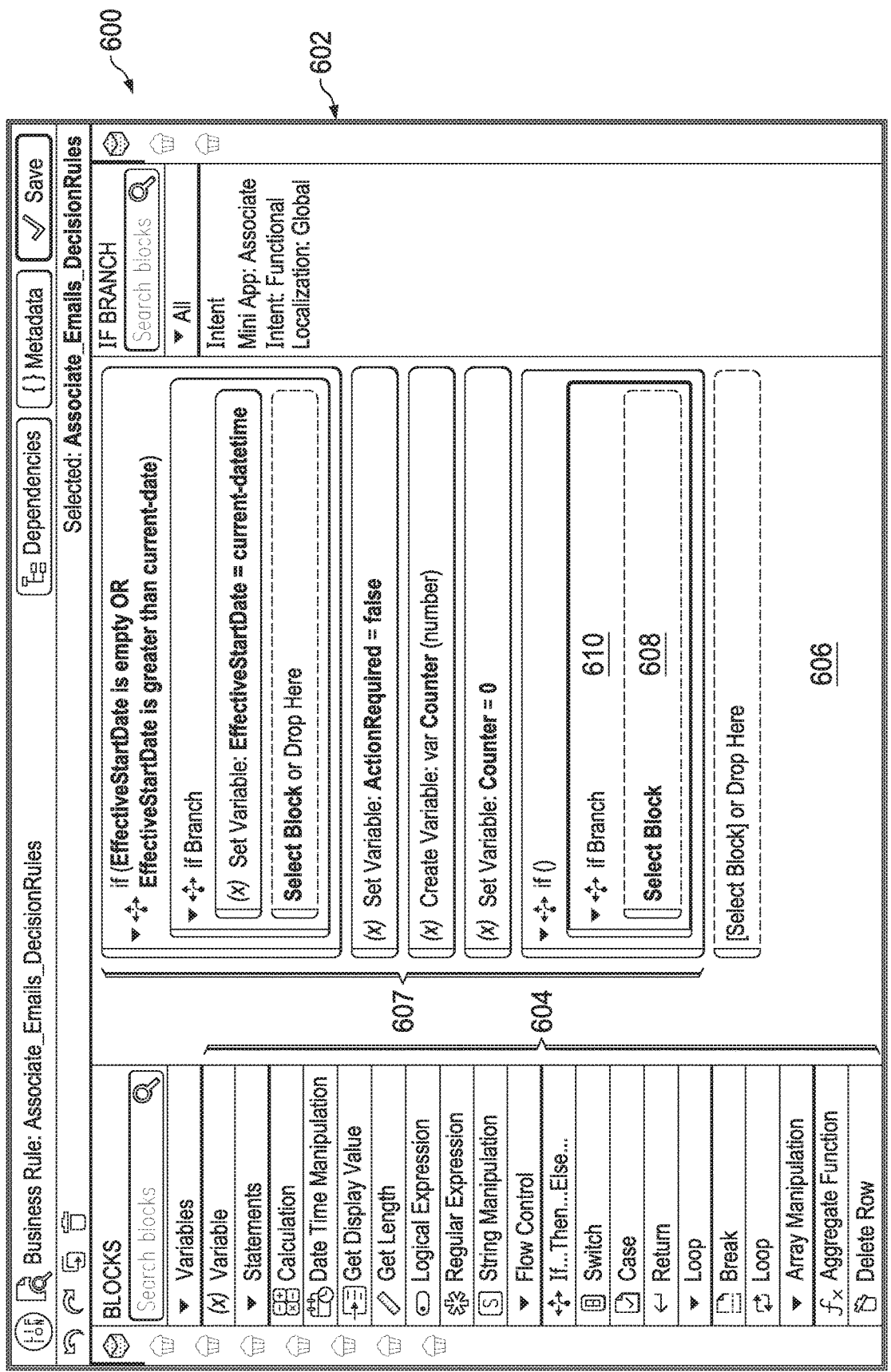
FIG. 6 is a graphical user interface for composing structured data objects according to a domain-specific language in accordance with an illustrative embodiment.

With reference next to FIG. 6, a graphical user interface for composing structured data objects according to a domain-specific language is depicted according to an illustrative example. Graphical user interface 600 is an example of graphical user interface 512 of FIG. 5.

As depicted, graphical user interface 600 includes first area 602. First area 602 is an example of first area 510 of FIG. 5. First area 602 includes tiles 604. Tiles 604 are examples of tiles 506, as shown in block form in FIG. 5.

As depicted, graphical user interface 600 includes second area 606. Second area 606 includes a plurality of data nodes that have been linked together to form structured data object 607 according to a domain-specific language. As depicted, drop zone 608 is associated with data node 610. Dragging tiles 604 from first area 602 to drop zone 608 appends the corresponding set of data nodes into data nodes 610 according to the domain-specific language.

Figure 7:
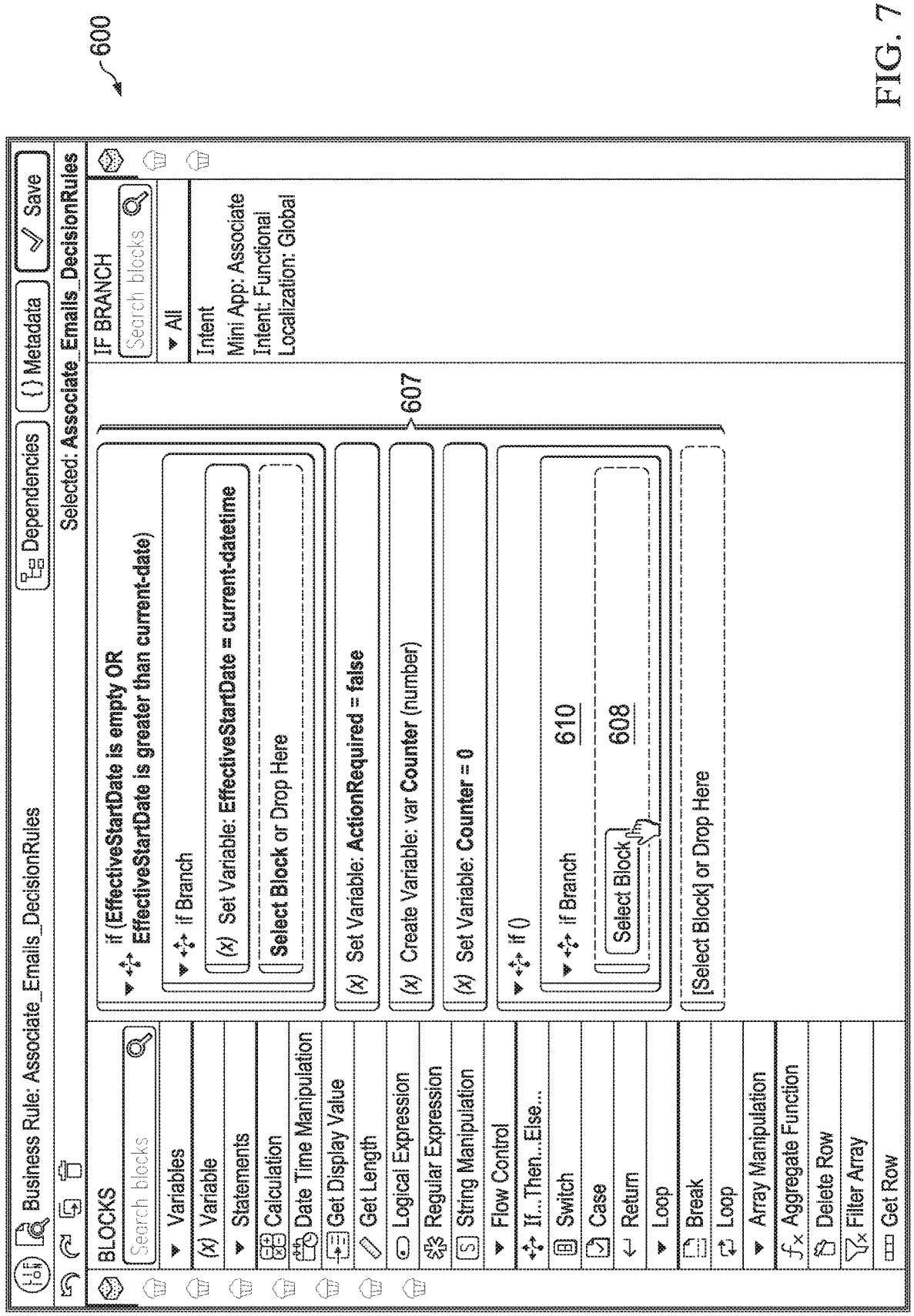
FIG. 7 is an illustration of graphical user interface 600 having a focus sent to a particular data node in accordance with an illustrative embodiment.

With reference next to FIG. 7, an illustration of graphical user interface 600 having a focus sent to a particular data node is depicted in accordance with an illustrative example. In this illustrative example, a user can set focus of graphical user interface 600 on data nodes 610 by, for example, using a tab key of a keyboard to set focus on drop zone 608, or by a click or tap on drop zone 608 using a suitable input device. As depicted, the focus on drop zone 608 is indicated by the highlighting of drop zone 608 within graphical user interface 600.

Figure 8:
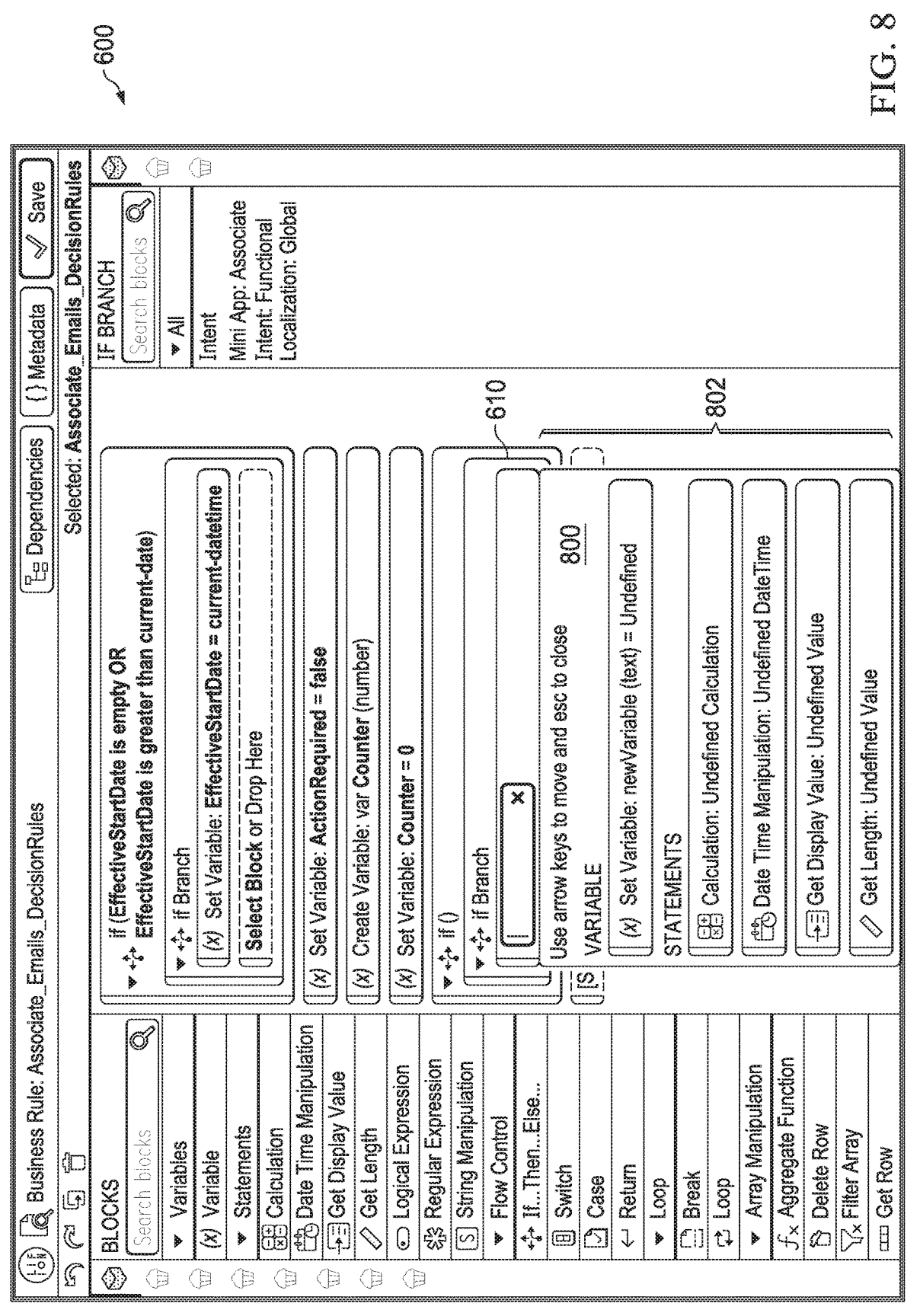

With reference next to FIG. 8, an illustration of graphical user interface 600 with a drop-down list is depicted in accordance with an illustrative example. Drop-down list 800 is an example of drop-down list 530 shown in block form in FIG. 5. In this illustrative example, drop-down list 800 is displayed in response to receiving a user input that sets focus on drop zone 608, as illustrated in FIG. 7. Drop-down list 800 consists only of a set of permissible tiles 802 for data nodes that can be appended to data nodes 610 according to a context of structured data object 607.

Figure 9:
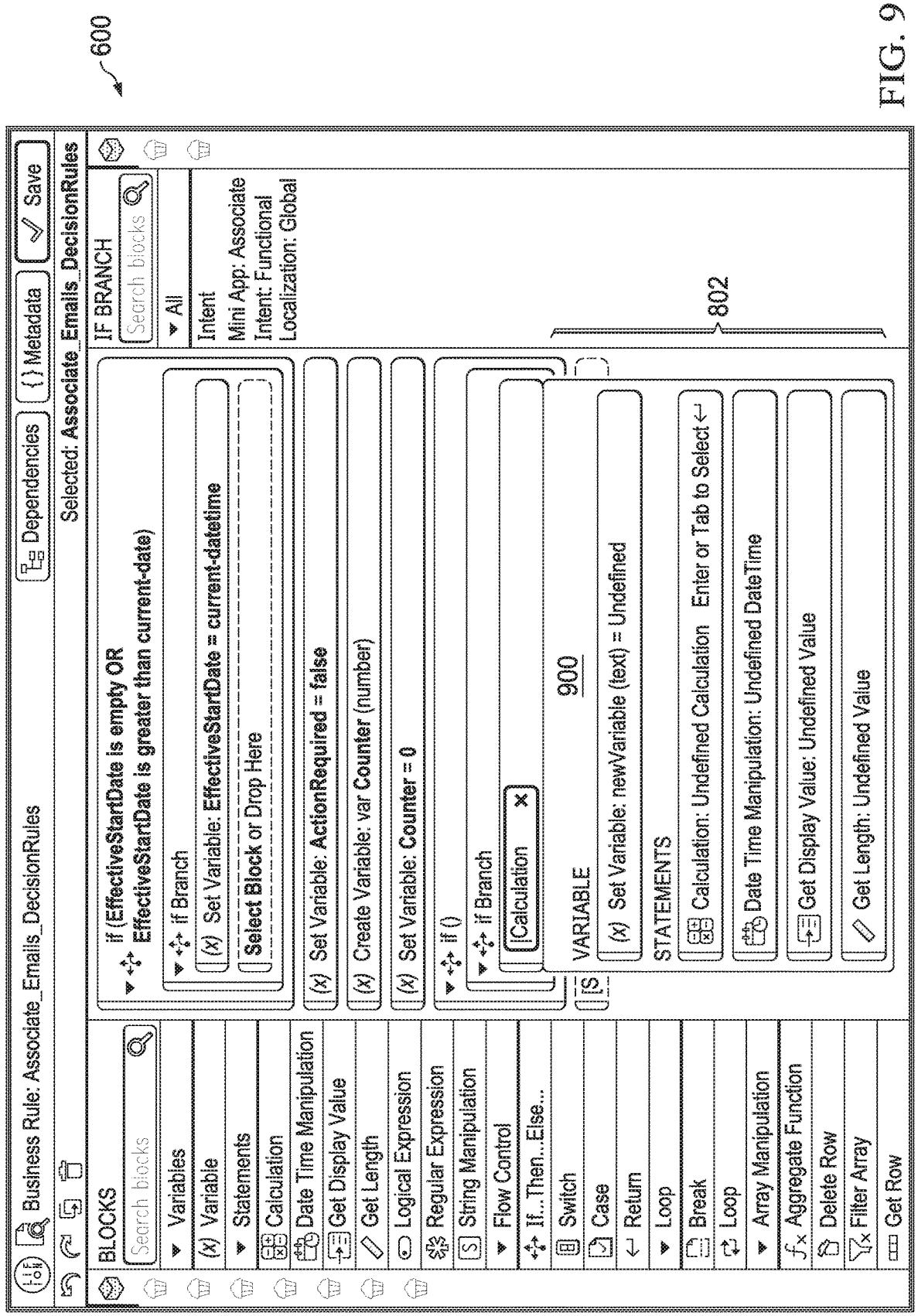
FIG. 9 is an illustration of graphical user interface 600 selecting a particular data node from drop-down list 800 in accordance with an illustrative embodiment.

With reference next to FIG. 9, an illustration of graphical user interface 600 selecting a particular data node from drop-down list 800 in depicted in accordance with an illustrative example. In this illustrative example, a user can set focus of graphical user interface 600 on data nodes 610 by, for example, using a tab key of a keyboard to set focus on data node 900 from drop-down list 800, or by a click or tap on data node 900 using a suitable input device. As depicted, focus on data node 900 is indicated by the highlighting of data node 900 within drop-down list 800 of graphical user interface 600.

Figure 10:
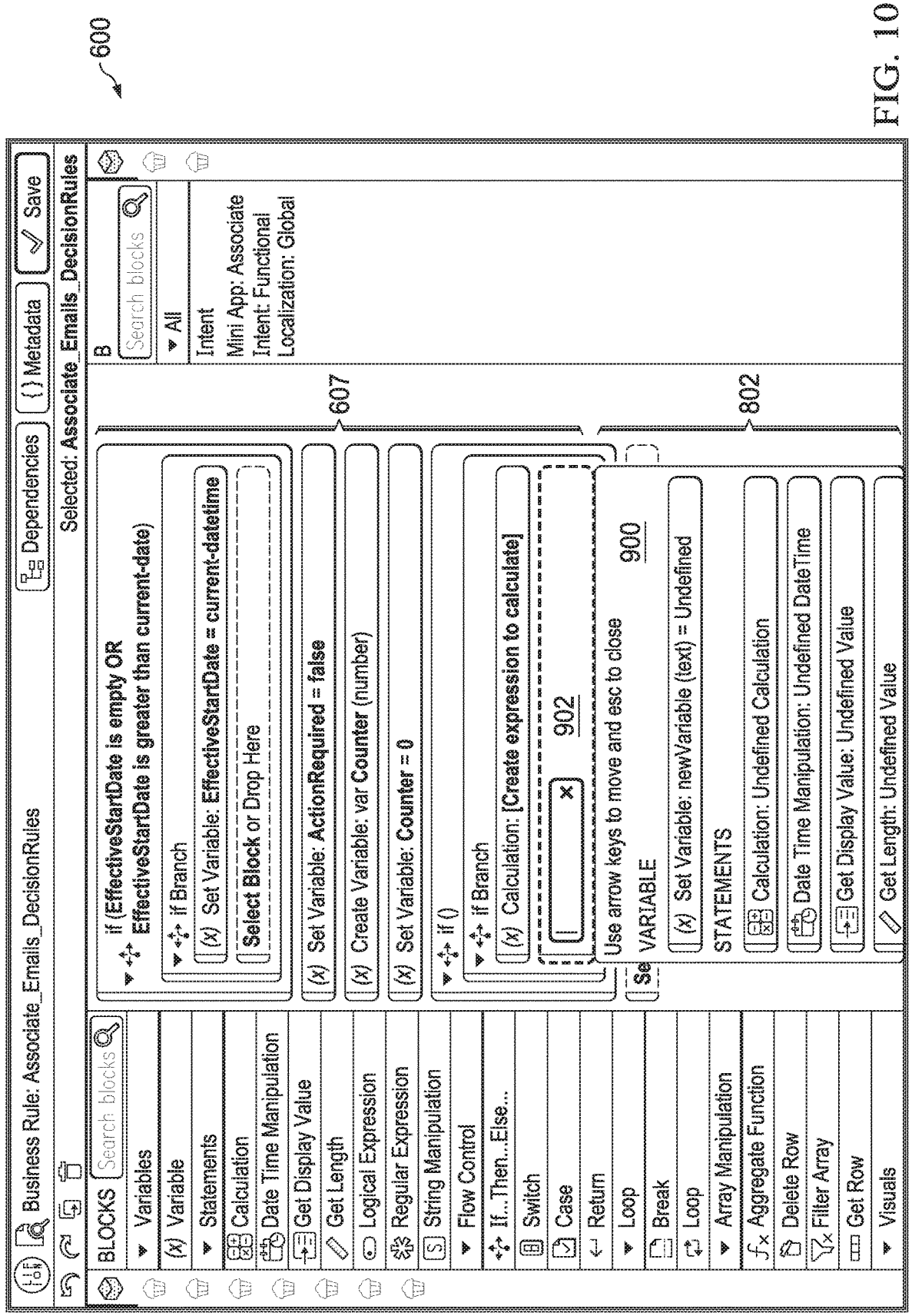
FIG. 10 is an illustration of graphical user interface 600 having appended a particular data node in accordance with an illustrative embodiment.

With reference next to FIG. 10, an illustration of graphical user interface 600 having appended a particular data node is depicted in accordance with an illustrative example. In this illustrative example, data node 900 has been appended to structured data object 607 based on its selection from drop-down list 800 of FIG. 8. In this illustrative example, when data node 900 is added to structured data object 607, focus is automatically shifted from data node 900 to drop zone 902, enabling a user to select a subsequent block for inclusion in structured data object 607.

Figure 11:
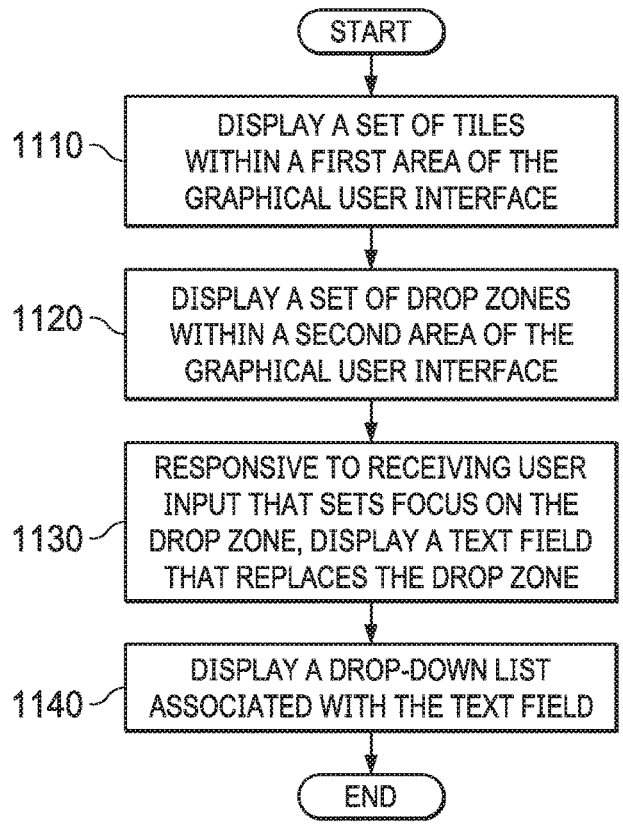
FIG. 11 is an illustration of a flowchart of a process for composing a business rule in accordance with an illustrative embodiment.

With reference next to FIG. 11, an illustration of a flowchart of a process for composing a business rule is depicted in accordance with an illustrative example. Process 1100 is a software process implemented using one or more components of application development system 502 of FIG. 5.

The process begins by displaying a set of tiles (step 1110). Each tile corresponds to a set of data nodes that are composable into structured data objects according to a domain-specific language. The set of tiles are displayed within a first area of a graphical user interface.

The process displays a set of drop zones within a second area of the graphical user interface (step 1120). Dragging a selected tile from the first area to a drop zone within the second area appends the corresponding set of data nodes into a structured data object according to the domain-specific language.

Responsive to receiving a user input that sets focus on the drop zone, the process displays a text field that replaces the drop zone within the second area (step 1130).

Figure 12:
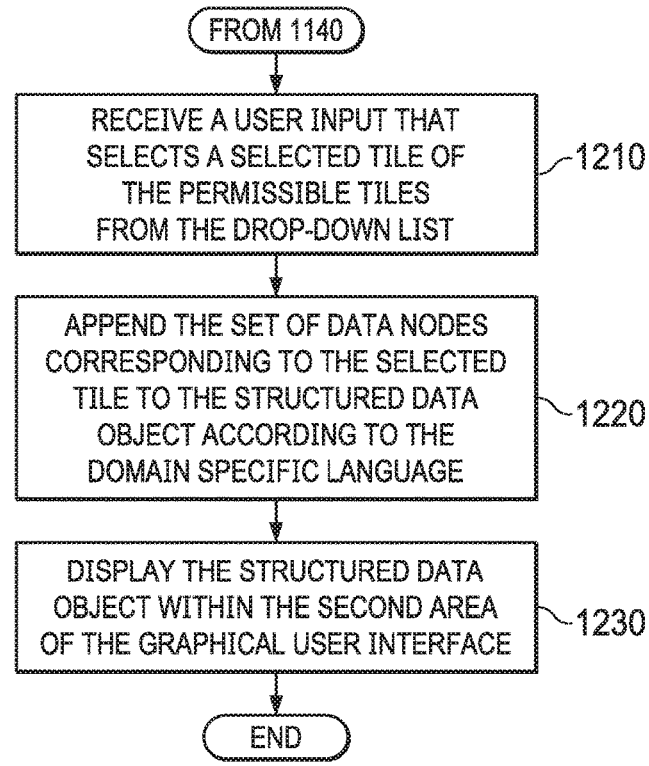
FIG. 12 is a second illustration of a flowchart of a process for composing a business rule in accordance with an illustrative embodiment.

With reference next to FIG. 12, a second illustration of a flowchart for a process composing a business rule is depicted according to an illustrative example. Process 1100 is a software process implemented using one or more components of application development system 502 of FIG. 5.

Continuing from step 1140 of FIG. 11, the process receives a user input that selects a selected tile of the permissible tiles from the drop-down list (step 1210). The process appends the set of data nodes corresponding the selected tile to the structured data object according to the domain-specific language (step 1220). The process displays the structured data object within the second area of the graphical user interface (step 1230), with the process terminating thereafter.

Figure 13:
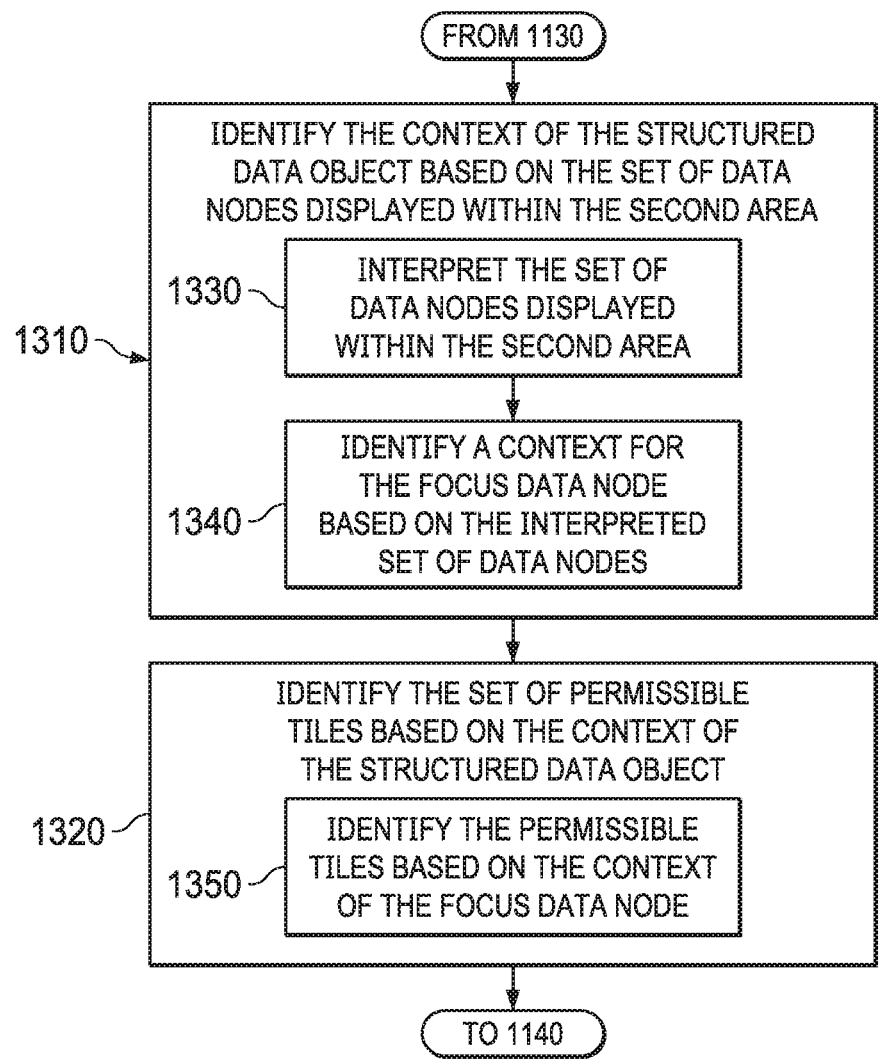
FIG. 13 is a third illustration of a flowchart of a process for composing a business rule in accordance with an illustrative embodiment.

With reference next to FIG. 13, a third illustration of a flowchart for a process composing a business rule is depicted according to an illustrative example. Process 1300 is a software process implemented using one or more components of application development system 502 of FIG. 5.

Continuing from step 1130 of FIG. 11, the process identifies the context of the structured data object based on the set of data nodes displayed within the second area of the graphical user interface (step 1310). In one or more examples, step 1310 can include interpreting the set of data nodes displayed within the second area of the graphical user interface (step 1330), and identifying a context for the focus data node the focus data node based on the interpreted set of data nodes (step 1340).

The process then identifies the set of permissible tiles based on the context of the structured data object (step 1320). In one or more examples, step 1320 can include identifying the set of permissible tiles based on the context for the focus data node (step 1350). Thereafter, the process proceeds to step 1140 of FIG. 11.

Figure 14:
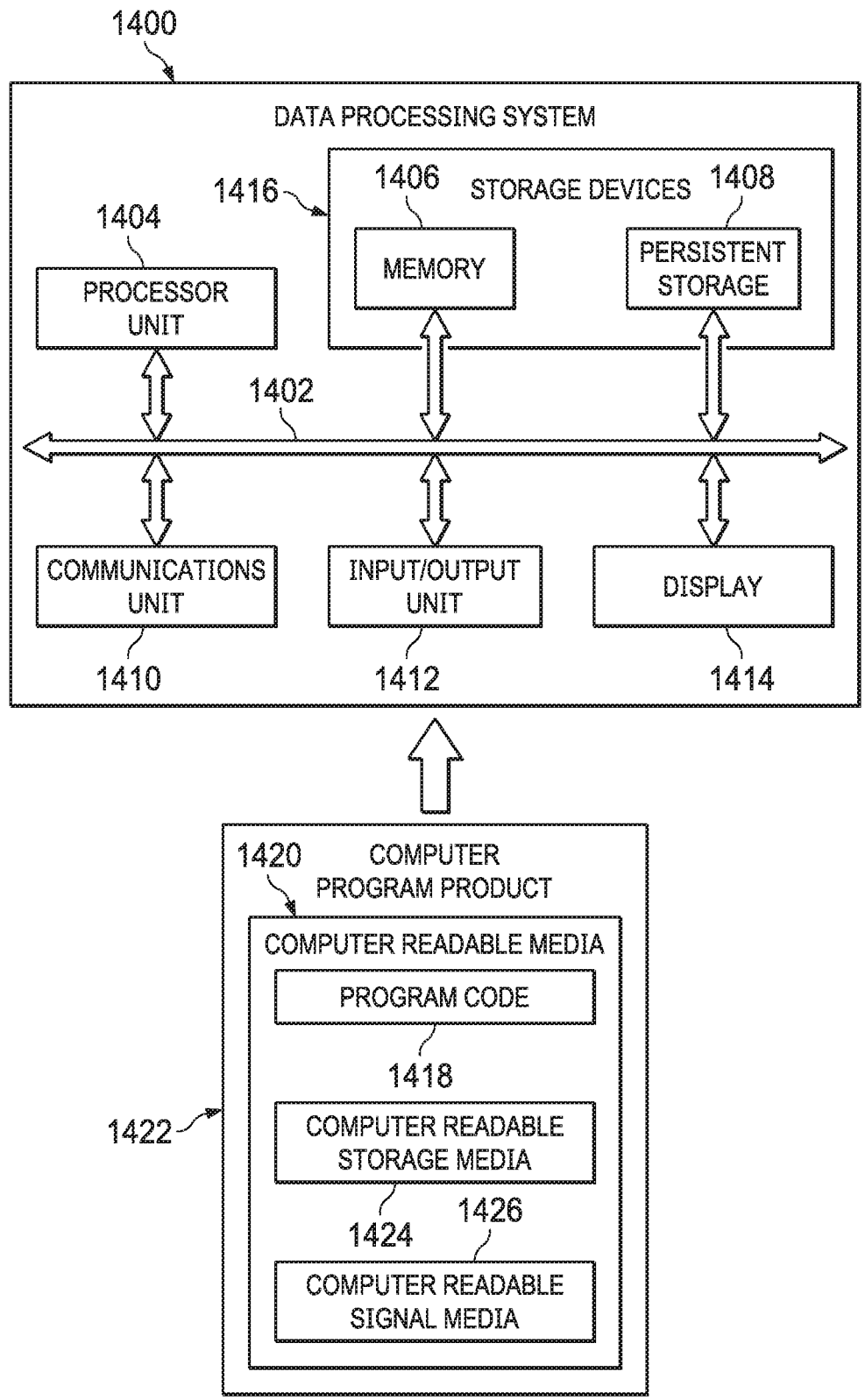
FIG. 14 is an illustration of a block diagram of a data processing system in accordance with an illustrative embodiment.

Turning now to FIG. 14, an illustration of a block diagram of a data processing system is depicted in accordance with an illustrative embodiment. Data processing system 1400 may be used to implement one or more computers, such as server computers 104, 106 and client computers 110, 112, 114 in FIG. 1.

In this illustrative example, data processing system 1400 includes communications framework 1402, which provides communications between processor unit 1404, memory 1406, persistent storage 1408, communications unit 1410, input/output unit 1412, and display 1414. In this example, communications framework 1402 may take the form of a bus system.

Processor unit 1404 serves to execute instructions for software that may be loaded into memory 1406. Processor unit 1404 may be a number of processors, a multi-processor core, or some other type of processor, depending on the particular implementation. In an embodiment, processor unit 1404 comprises one or more conventional general purpose central processing units (CPUs). In an alternate embodiment, processor unit 1404 comprises one or more graphical processing units (CPUs).

Memory 1406 and persistent storage 1408 are examples of storage devices 1416. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1416 may also be referred to as computer-readable storage devices in these illustrative examples. Memory 1406, in these examples, may be, for example, a random access memory or any other suitable volatile or non-volatile storage device. Persistent storage 1408 may take various forms, depending on the particular implementation.

For example, persistent storage 1408 may contain one or more components or devices. For example, persistent storage 1408 may be a hard drive, a flash memory, a rewritable optical disk, a rewritable magnetic tape, or some combination of the above. The media used by persistent storage 1408 also may be removable. For example, a removable hard drive may be used for persistent storage 1408. Communications unit 1410, in these illustrative examples, provides for communications with other data processing systems or devices. In these illustrative examples, communications unit 1410 is a network interface card.

Input/output unit 1412 allows for input and output of data with other devices that may be connected to data processing system 1400. For example, input/output unit 1412 may provide a connection for user input through at least one of a keyboard, a mouse, or some other suitable input device. Further, input/output unit 1412 may send output to a printer. Display 1414 provides a mechanism to display information to a user.

Instructions for at least one of the operating system, applications, or programs may be located in storage devices 1416, which are in communication with processor unit 1404 through communications framework 1402. The processes of the different embodiments may be performed by processor unit 1404 using computer-implemented instructions, which may be located in a memory, such as memory 1406.

These instructions are referred to as program code, computer-usable program code, or computer-readable program code that may be read and executed by a processor in processor unit 1404. The program code in the different embodiments may be embodied on different physical or computer-readable storage media, such as memory 1406 or persistent storage 1408.

Program code 1418 is located in a functional form on computer-readable media 1420 that is selectively removable and may be loaded onto or transferred to data processing system 1400 for execution by processor unit 1404. Program code 1418 and computer-readable media 1420 form computer program product 1422 in these illustrative examples. In one example, computer-readable media 1420 may be computer-readable storage media 1424 or computer-readable signal media 1426.

In these illustrative examples, computer-readable storage media 1424 is a physical or tangible storage device used to store program code 1418 rather than a medium that propagates or transmits program code 1418. Alternatively, program code 1418 may be transferred to data processing system 1400 using computer-readable signal media 1426.

Computer-readable signal media 1426 may be, for example, a propagated data signal containing program code 1418. For example, computer-readable signal media 1426 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1400 are not meant to provide architectural limitations to the manner in which different embodiments may be implemented. The different illustrative embodiments may be implemented in a data processing system including components in addition to or in place of those illustrated for data processing system 1400. Other components shown in FIG. 14 can be varied from the illustrative examples shown. The different embodiments may be implemented using any hardware device or system capable of running program code 1418.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for composing a business rule, the method comprising:

displaying, by a computer system, a set of tiles, each tile corresponding to a set of data nodes that are composable structured data objects according to a domain-specific language, wherein the set of tiles are displayed within a first area of a graphical user interface;

displaying, by the computer system, a set of drop zones within a second area of the graphical user interface, wherein dragging a selected tile from the first area to a drop zone within the second area appends a corresponding one of the set of data nodes into a structured data object according to the domain-specific language;

responsive to receiving a user input that sets focus on the drop zone, displaying, by the computer system, a text field that replaces the drop zone within the second area;

responsive to displaying the text field, displaying, by the computer system, a drop-down list associated with the text field, wherein the drop-down list consists of a set of permissible tiles for data nodes that can be appended to the structured data object according to a context of the structured data object receiving, by the computer system, the user input that selects a selected tile of the set of permissible tiles from the drop-down list; and appending, by the computer system, the set of data nodes corresponding the selected tile to the structured data object according to the domain-specific language.

2. The method of claim 1, further comprising:

displaying, by the computer system, the structured data object within the second area of the graphical user interface.

3. A method for composing a business rule, the method comprising:

displaying, by a computer system, a set of tiles, each tile corresponding to a set of data nodes that are composable structured data objects according to a domain-specific language, wherein the set of tiles are displayed within a first area of a graphical user interface;

displaying, by the computer system, a set of drop zones within a second area of the graphical user interface, wherein dragging a selected tile from the first area to a drop zone within the second area appends a corresponding one of the set of data nodes into a structured data object according to the domain-specific language;

responsive to receiving a user input that sets focus on the drop zone, displaying, by the computer system, a text field that replaces the drop zone within the second area;

responsive to displaying the text field, displaying, by the computer system, a drop-down list associated with the text field, wherein the drop-down list consists of a set of permissible tiles for data nodes that can be appended to the structured data object according to a context of the structured data object identifying, by the computer system, the context of the structured data object based on the set of data nodes displayed within the second area of the graphical user interface; and identifying, by the computer system, the set of permissible tiles based on the context of the structured data object.

4. The method of claim 3, wherein the drop zone is associated with a focus data node of the set of data nodes displayed within the second area of the graphical user interface.

5. The method of claim 4, wherein identifying the context of the structured data object further comprises:

interpreting, by the computer system, the set of data nodes displayed within the second area of the graphical user interface;

identifying, by the computer system, a context for the focus data node the focus data node based on the interpreted set of data nodes; and identifying, by the computer system, the set of permissible tiles based on the context for the focus data node.

6. A computer system comprising:

a hardware processor; and an application development system in communication with the hardware processor, wherein the application development system is configured:

to display a set of tiles, each tile corresponding to a set of data nodes that are composable structured data objects according to a domain-specific language, wherein the set of tiles are displayed within a first area of a graphical user interface;

to display a set of drop zones within a second area of the graphical user interface, wherein dragging a selected tile from the first area to a drop zone within the second area appends a corresponding one of the set of data nodes into a structured data object according to the domain-specific language;

responsive to receiving a user input that sets focus on the drop zone, to display a text field that replaces the drop zone within the second area; and responsive to displaying the text field, to display a drop-down list associated with the text field, wherein the drop-down list consists of a set of permissible tiles for data nodes that can be appended to the structured data object according to a context of the structured data object, wherein the application development system is further configured:

to receive the user input that selects the selected tile of the permissible tiles from the drop-down list; and to append the set of data nodes corresponding the selected tile to the structured data object according to the domain-specific language.

7. The computer system of claim 6, wherein the application development system is further configured:

to display the structured data object within the second area of the graphical user interface.

8. A computer system comprising:

a hardware processor; and an application development system in communication with the hardware processor, wherein the application development system is configured:

to display a set of tiles, each tile corresponding to a set of data nodes that are composable structured data objects according to a domain-specific language, wherein the set of tiles are displayed within a first area of a graphical user interface;

to display a set of drop zones within a second area of the graphical user interface, wherein dragging a selected tile from the first area to a drop zone within the second area appends a corresponding one of the set of data nodes into a structured data object according to the domain-specific language;

responsive to receiving a user input that sets focus on the drop zone, to display a text field that replaces the drop zone within the second area; and responsive to displaying the text field, to display a drop-down list associated with the text field, wherein the drop-down list consists of a set of permissible tiles for data nodes that can be appended to the structured data object according to a context of the structured data object, wherein the application development system is further configured:

to identify the context of the structured data object based on the set of data nodes displayed within the second area of the graphical user interface; and to identify the set of permissible tiles based on the context of the structured data object.

9. The computer system of claim 8, wherein the drop zone is associated with a focus data node of the set of data nodes displayed within the second area of the graphical user interface.

10. The computer system of claim 9, wherein in identifying the context of the structured data object, the application development system is further configured:

to interpret the set of data nodes displayed within the second area of the graphical user interface;

to identify a context for the focus data node the focus data node based on an interpreted one of the set of data nodes; and to identify the set of permissible tiles based on the context for the focus data node.

11. A computer program product for composing a business rule, the computer program product comprising:

a non-transitory computer-readable storage media;

program code, stored on the computer-readable storage media, for displaying a set of tiles, each tile corresponding to a set of data nodes that are composable structured data objects according to a domain-specific language, wherein the set of tiles are displayed within a first area of a graphical user interface;

program code, stored on the computer-readable storage media, for displaying a set of drop zones within a second area of the graphical user interface, wherein dragging a selected tile from the first area to a drop zone within the second area appends a corresponding one of the set of data nodes into a structured data object according to the domain-specific language;

program code, stored on the computer-readable storage media, for displaying the a text field that replaces the drop zone within the second area in response to receiving a user input that sets focus on the drop zone;

program code, stored on the computer-readable storage media, for displaying a drop-down list associated with the text field in response to displaying the text field, wherein the drop-down list consists of a set of permissible tiles for data nodes that can be appended to the structured data object according to a context of the structured data object;

program code, stored on the computer-readable storage media, for receiving the user input that selects the selected tile of the permissible tiles from the drop-down list; and program code, stored on the computer-readable storage media, for appending the set of data nodes corresponding the selected tile to the structured data object according to the domain-specific language.

12. The computer program product of claim 11, further comprising:

program code, stored on the computer-readable storage media, for displaying the structured data object within the second area of the graphical user interface.

13. A computer program product for composing a business rule, the computer program product comprising:

a non-transitory computer-readable storage media;

program code, stored on the computer-readable storage media, for displaying a set of tiles, each tile corresponding to a set of data nodes that are composable structured data objects according to a domain-specific language, wherein the set of tiles are displayed within a first area of a graphical user interface;

program code, stored on the computer-readable storage media, for displaying a set of drop zones within a second area of the graphical user interface, wherein dragging a selected tile from the first area to a drop zone within the second area appends a corresponding one of the set of data nodes into a structured data object according to the domain-specific language;

program code, stored on the computer-readable storage media, for displaying the a text field that replaces the drop zone within the second area in response to receiving a user input that sets focus on the drop zone;

program code, stored on the computer-readable storage media, for displaying a drop-down list associated with the text field in response to displaying the text field, wherein the drop-down list consists of a set of permissible tiles for data nodes that can be appended to the structured data object according to a context of the structured data object;

program code, stored on the computer-readable storage media, for identifying the context of the structured data object based on the set of data nodes displayed within the second area of the graphical user interface; and program code, stored on the computer-readable storage media, for identifying the set of permissible tiles based on the context of the structured data object.

14. The computer program product of claim 13, wherein the drop zone is associated with a focus data node of the set of data nodes displayed within the second area of the graphical user interface.

15. The computer program product of claim 14, wherein program code for identifying the context of the structured data object further comprises:

program code for interpreting the set of data nodes displayed within the second area of the graphical user interface;

program code for identifying a context for the focus data node the focus data node based on an interpreted one of the set of data nodes; and program code for identifying the set of permissible tiles based on the context for the focus data node.

\* \* \* \* \*